US008543348B2

(12) United States Patent
Alber et al.

(10) Patent No.: US 8,543,348 B2
(45) Date of Patent: Sep. 24, 2013

(54) METHOD AND ARRANGEMENT FOR AUTOMATIC CALIBRATING OF SPECTROMETERS

(75) Inventors: Thomas Alber, Stuttgart-Vaihingen (DE); Edin Andelic, Stuttgart (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 220 days.

(21) Appl. No.: 12/996,668

(22) PCT Filed: Jun. 3, 2009

(86) PCT No.: PCT/EP2009/056801
§ 371 (c)(1),
(2), (4) Date: Dec. 7, 2010

(87) PCT Pub. No.: WO2009/150082
PCT Pub. Date: Dec. 17, 2009

(65) Prior Publication Data
US 2011/0093232 A1    Apr. 21, 2011

(30) Foreign Application Priority Data

Jun. 10, 2008 (DE) .......................... 10 2008 027 542
Jun. 11, 2008 (DE) .......................... 10 2008 002 355

(51) Int. Cl.
*G06F 19/00* (2011.01)
(52) U.S. Cl.
USPC ........................................................ 702/104
(58) Field of Classification Search
USPC ........................................................ 702/104
See application file for complete search history.

(56) References Cited

U.S. PATENT DOCUMENTS 5,347,460 A    9/1994    Gifford

FOREIGN PATENT DOCUMENTS

CN    1831516 A    9/2006

OTHER PUBLICATIONS

Specialized software utilities for gamma ray spectrometry, Final report of a co-ordinated research project 1996-2000, 108 pages, International Atomic Energy Agency Wagramer Strasse 5, P.O. Box 100, A-1400 Vienna, Austria.*
Said Moussaoui et al., "Bayesian Analysis of spectral mixture data using Markov Chain Monte Carlo Methods", Chemometrics and Intelligent Laboratory Systems, Elsevier Science Publishers, Amsterdam, NL, Bd. 81, Nr. 2, Apr. 16, 2006, XP024894895.
Hongshu Chen et al., "Toward Bayesian chemometrics—a tutorial on some recent advances", Analytica Chimica ACTA, Elsevier, Amsterdam, NL, Bd. 602, Nr. 1, Oct. 2007, XP022293116.

* cited by examiner

*Primary Examiner* — Tung S Lau
(74) *Attorney, Agent, or Firm* — Bacon & Thomas, PLLC

(57) ABSTRACT

An arrangement and method for calibrating a spectrometer with a spectrometric apparatus for measuring spectral fractions of the substance to be examined as well as with a calibration unit. The calibrating of the spectrometric apparatus and/or measurement data based on measured spectrometric data is performed, by the following steps: a) measuring a totality of spectral fractions of the substance to be examined; b) storing the totality of the measured spectral fractions in a memory module in the form of a multidimensional coefficient vector; c) automatic extracting, from the totality of the measured spectral fractions physically relevant for the particular measuring procedure via an automatically running, iterative, estimation method furnished in the calibration unit; and d) calibrating the measured spectrometric measurement data for the investigated substance based on the step c) extracted, spectral fractions of the spectrometric data physically relevant for the substance to be examined.

13 Claims, 2 Drawing Sheets

METHOD AND ARRANGEMENT FOR AUTOMATIC CALIBRATING OF SPECTROMETERS

TECHNICAL FIELD

The invention relates to a method as well as to an arrangement for calibrating spectrometers with regard to their application in chemometrics.

BACKGROUND DISCUSSION

Spectrometers are applied for investigation of substances or of measured objects, wherein spectral fractions of different wavelengths are registered as spectrometric data and examined. The spectral ranges and corresponding wavelengths of the spectral fractions of a substance to be examined can, in such case, vary across a relatively large wavelength range. The spectrometers register the spectral fractions of different wavelengths as a function of their respective intensities, from which deductions concerning the composition of the investigated substance can be made.

The present invention is concerned with the calibrating of such spectrometers. In the state of the art, it is known, on the one hand, to conduct a calibrating of spectrometers or spectral apparatuses by mechanical corrections and adjustments to the apparatus itself. Thus, for example, in WO/2003/067204, a calibrating of echelle-spectrometers is described, in the case of which, through adjustment of the slit width of an intermediate slit arrangement, a calibrating of a pre-chromator to its desired position occurs.

Furthermore, it is known in the state of the art to perform the calibrating of measured spectra and associated substance concentrations of the measured object on the level of the spectrometric data: if chemometrics are selected, for example, from a plurality of measured spectral fractions those spectral fractions physically relevant for the particular measurement object are considered, and by means of this selection, a calibrating of the spectrometric apparatus is performed. The known calibration methods with selection of relevant spectral fractions from the total measured spectrum of the spectrometric data most often used, in such case, iterative algorithms are employed, in order to calculate main components from a matrix composed of the intensities of the measured spectra. In the context of calibrating of spectrometers previously used for this purpose, for example, mathematical methods such as the "partial least squares method" (PLS method for short), or similar such iterative algorithms. These estimation methods serve the purpose of providing a solution for the so-called minimizing problem in the case of under-determined systems of equations. Disadvantageous in the case of the known methods for minimizing the measured data set such as the PLS method is, however, that, for the selection of particular physically relevant spectral fractions from the totality of measured wavelengths, recourse to expert knowledge is always necessary. Only a "manual" selection by bringing in a specialist concerned with spectrometric measuring allows the performance of a calibrating of spectrometric data by means of such iterative known algorithms. The known methods for calibrating are, consequently, cost and time intensive and can vary in their calibration quality, depending on the particular expert. The previously necessary bringing in of an expert or expert system is based, moreover, on an estimation methodology which can easily lead to errors in the calibrating of the data.

SUMMARY OF THE INVENTION

In contrast, an object the present invention is to provide a method as well as an arrangement for calibrating of spectrometers or of spectrometric measurement data which are further optimized with respect to the known methods and arrangements, and which deliver good calibration results with reduced effort. Moreover, the calibrating of spectrometers should be praciticable in an effective and reliable manner with as little influence as possible by operators on the calibration quality.

According to the present invention, for achievement of the stated object, a method for calibrating a spectrometer for measuring spectral fractions of a substance in the context of chemometrics, i.e. statistical mathematically supported investigation of chemical measurement data, or other chemometric processes is provided, with a spectrometric apparatus for measuring spectral fractions of the substance to be examined, as well as with a calibration unit, by means of which is performed a calibrating of the spectrometric apparatus and/or the measurement data on the basis of measured spectrometric data, wherein the method of the invention is characterized through the steps:

a) measuring a totality of spectral fractions X and/or corresponding substance concentrations of a substance to be examined;

b) storing the totality of the measured spectral fractions X in a memory module as spectrometric measurement data in the form of a multidimensional coefficient vector;

c) automatic extracting of spectral fractions $X_{rel}$ physically relevant for the particular measuring procedure from the totality of the measured spectral fractions X via an automatically running iterative estimation method furnished in the calibration unit; and d) calibrating the measured spectrometric measurement data for the investigated substance or the measurement object on the basis of spectral fractions $X_{rel}$ of the spectrometric data physically relevant for the substance to be examined, extracted in step c).

By extracting or selecting (as performed in step c)) from all measured spectral fractions X in each case only physically relevant spectral fractions $X_{rel}$—a process which, according to the invention, runs fully automatically—for the calibrating of measured spectra and of corresponding substance concentrations (for example, in the context of chemometric data analyses), a recourse to expert knowledge is no longer required. The expert and expert knowledge, which previously were required in the case of known calibration methods of such a sort for the selection of relevant spectral fractions, are, according to the invention, replaced by an automatically running iterative estimation method, on the basis of which an automatic extracting of relevant spectral fractions $X_{rel}$ is possible. Only the relevant extracted spectral fractions $X_{rel}$ find their way into the subsequent calibrating in step d) of the measured spectrometric data or the spectrometric apparatus. In this way, the calculative effort and the time consumed for calibrating are clearly reduced with respect to the previously known methods for calibrating. The calibration quality is also especially not degraded by the method of the invention, or is indeed even partially increased with respect to the methods of the state of the art. At least constant calibration accuracies are assured by the calibration method of the invention, which is automatic and executable without recourse to individual experts.

In the case of spectrometric measurements, for example, in the context of chemometrics, the number of measured spectral fractions and associated substance concentrations leads regularly to a multidimensional coefficient vector. The latter corresponds to an under-determined equation system, which theoretically would lead to an infinite number of solutions. It was therefore previously required in the state of the art to select the relevant wavelengths or wavelength ranges via an expert—so-to-speak "manually"—for each particular measurement.

This is, according to the invention, now no longer required, since an exact estimation of the relevance of measured spectral fractions is performed automatically, i.e. without bringing in experts: Through the automatically running iterative estimation method, which, according to the invention, can especially—however, not exclusively—be a method on the basis the so-called Bayesian inference, the spectral fractions $X_{rel}$ relevant for a particular measuring procedure are ascertainable automatically and with relatively little calculational effort, and therewith relatively little time consumed. With the new calibration method of the invention, on the basis of an estimation methodology according to Bayes, the physical reality is better mapped, since only physically relevant spectral fractions for a particular substance enter into the calibrating and other data analyses; i.e. only the determined wavelengths which are actually absorbed by a particular substance. A selection of the relevant wavelengths or spectral fractions $X_{rel}$ can, according to the invention, occur without recourse to expert knowledge to be otherwise provided, and indeed while maintaining or even improving the calibration quality with respect to the previously known methods of such a sort.

Moreover, with the calibration method of the invention, a database can be created, on the basis of which later measurements and calibrations can be performed much faster than previously. The essential advantage of the method of the invention lies in the fact that, in the case of calibrating a spectrometer, relevant spectral fractions can automatically be extracted, that is to say selected from a plurality of actually measured but partially insignificant or uninteresting spectral fractions. Not least of all, the method of the invention enables measurements to be performed much faster than previously, since only selected wavelengths or regions of wavelengths (spectral part regions) must, in each case, be measured.

According to an advantageous embodiment of the method of the invention, in step c), the automatically extracted or selected relevant spectral fractions $X_{rel}$ together with data regarding the investigated substance are stored in a memory module for a later application in subsequent measurements and/or calibration procedures with the spectrometric apparatus. The data regarding the investigated substance are, for example, the particular associated substance concentrations in the relevant spectral fractions $X_{rel}$. Other data can be the substance composition, the substance description or information regarding the investigated substance resulting from other investigations and analyses. By storing only the relevant spectral fractions $X_{rel}$ together with the corresponding substance data, a type of learning expert knowledge is constructed and regularly stored as a file in the system. In this way, the quality and the information content of measurement results of the spectrometer become increasingly better, the more measurements and calibration procedures that are performed according to the invention.

According to an additional advantageous embodiment of the method of the invention, the steps a) through d) or at least the steps b) through d) are performed repeatedly and automatically after each measurement with the spectrometric apparatus. In this way, each measurement and therewith each measurement result of the spectrometer is further optimized in quality. The calibrating automatically performed after each measurement by means of the method of the invention's steps b) through d) permits the quality of the measurement results and the calibration quality to be in each case, at least maintained, independent of the measurement object and the substance to be examined. The quality of the results is even further improved with regard to the previously known method, and indeed improved after each measuring procedure.

According to an additional, in this regard alternative embodiment of the method of the invention, the steps b) through d) for calibrating the spectrometer or the spectrometric data are performed in predetermined time intervals. The periodic performing of the calibration procedure according to the invention has the advantage that the measurements can be performed faster, since a calibrating and a calculating of relevant extracted spectral fractions $X_{rel}$ need not be performed in the case of each measurement.

According to an additional advantageous embodiment of the method of the invention, relevant spectral fractions $X_{rel}$ of a substance to be examined in step c) are automatically (i.e. without interposition of an expert) extracted by an iterative estimation method according to Bayes, furnished in the calibration unit. Via the iterative estimation method according to Bayes—or a so-called Bayes-type estimation technique, also known to those skilled in the art from technical publications as "Bayesian Inference" in connection with other research areas—during the iteration in step c), coefficient values of the multidimensional coefficient vector (measured spectral fractions/associated substance concentrations) tending toward zero are, according to the invention, removed before a subsequent regression analysis. The estimation method according to Bayes, or the Bayesian inference has, according to the invention, the advantage, that an under-determined equation system of the coefficient vector to be estimated is carried over from a measurement by means of an as far as possible stochastic assumption of a determined probability distribution in a "sparse" solution of the coefficient vector. Through the extracting or removal of determined coefficients tending toward zero in the iteration, only those values of the coefficient vector remain, which are relevant for the regression analysis as such. The calculative effort and the time consumed for performing the automatic calibrating are thereby, according to the invention, strongly reduced. The information content and calibration quality, however, are not degraded, since the automatically ascertained result rests, on the basis of the Bayesian methodology or the Bayesian inference, upon strong statistical assumptions. Investigations have shown that with this methodology, a better informational quality is attainable in the estimated values, which are applied with the steps set forth according to the invention for increasing the calibration quality and for improving the measurement results of spectrometers.

According to an additional advantageous further development of the method of the invention, a functional ability and/or a state of aging of components of the spectrometric apparatus are diagnosed on the basis of stored extracted spectrometric data, as well as of currently measured extracted spectrometric data and/or on the basis of reference data. With such a diagnosis of the functional ability or the state of aging of components, according to the invention, it is possible, for example, to predict at an early stage a needed replacement of components of the spectrometric apparatus. The occurrence of errors due to non-recognized defective or lessened functioning in the components of the spectrometric apparatus is thus advantageously prevented by the invention.

The invention also relates to an arrangement for calibrating a spectrometer. According to this, through the invention, a calibration arrangement for spectrometers (for example, for application in chemometrics or during chemometric processes) is provided, which is used in the context of measuring of spectral fractions of a substance to be examined, and which especially—however, not exclusively—has: A spectrometric apparatus for measuring of spectral fractions X of the substance to be examined, a calibration unit for calibrating the spectrometric apparatus and a memory module for storing measured and/or calculated or evaluated spectrometric data, wherein the calibration arrangement is characterized in that a selection module is provided in the calibration unit, via which, on the basis of a mathematical iteration method, physically relevant spectral fractions $X_{rel}$ of a measuring of a substance are in each case automatically extractable or selectable, and that the selection module is connected with the memory module and the spectrometric apparatus. According to the invention, on the basis of a new mathematical iteration method, the calibration arrangement enables through the automatically functioning selection module in the calibration unit the completely automatic performing of the calibration procedure without recourse to external expert knowledge previously necessary in the case of such calibration systems in the state of the art.

Through the specifically provided selection module, which is connected with the calibration unit and in which the mathematical statistical extracting of only relevant spectral fractions $X_{rel}$ is automatically performed, a more exact calibrating of spectrometers on the basis of measured data itself or a calibrating of the measurement results can be performed. The calibration quality is, in such case, of a constant quality, or indeed further improved with respect to the hitherto known calibration methods in the state of the art. The selection module draws, in such case, on a specially matched mathematical statistical algorithm, which enables an automatic selection or an automatic extracting of relevant spectral fractions of the particular measured spectrometric data. The iterative estimation procedure or estimation algorithm stored in the selection module can, in such case, have different forms and embodiments, which, for example, were recently developed in other fields not related to the present invention, such as econometrics or statistics. Essential for the calibration arrangement of the invention is, however, not the particular type of estimation algorithm used, but rather that the form and function of the selection module are implemented in such a manner, that an automatic selecting of relevant spectral fractions and cooperation with the spectrometer as well as the associated calibration unit of the calibration arrangement are enabled.

According to an advantageous embodiment of the arrangement of the invention, the selection module is connected with the memory module and/or with the spectrometric apparatus by means of bidirectional data lines. This has the advantage that a faster communication is possible between the components of the arrangement without time loss. The relevant spectral fractions $X_{rel}$ specifically selected or extracted for each measurement can be fed without delay to the calibration unit for calibrating the measurement data. Equally, through the bidirectional functionality of the data lines, a transmission of relevant spectrometric data to the spectrometric system itself and back from the spectrometric system in the form of new measured spectral fractions of a new measurement procedure can occur directly and simultaneously via the data lines. Alternatively, the arrangement of the invention can also make use of other communication paths between the individual components. For example, a cableless data transmission via radio networks, internet or the like is also contemplated. In this case, the calibration unit and the selection module can also be arranged spatially isolated from the actual spectrometric apparatus. This also has, for example, the advantage, that a single calibration unit with an associated selection module for a plurality of spectrometric apparatuses which function automatically according to the invention can equally be applied. With regard to the number of elements and components of the calibration arrangement according to the invention and their placing—for example, integrated or separated—a multitude of variants are contemplated, without leaving the framework of the present invention.

According to an additional advantageous embodiment of the arrangement of the invention, the mathematical iteration method for estimation and selection of physically relevant spectrometric data of a measuring is stored in the selection module as a program, which is executed automatically in the calibration unit after each measuring. The program with the mathematical algorithm for extracting of relevant spectral fractions is, for this purpose, for example, implemented with a program code, which, in each case, in response to spectrometric data received from a measuring of the spectrometric system, automatically starts the calibrating according to the methodology of the invention.

According to an additional advantageous embodiment of the arrangement of the invention, the mathematical iteration algorithm in the selection module, which is used for selection of extracted spectral fractions $X_{rel}$ physically relevant for a particular measurement, is based on a method according to the so-called Bayesian inference. By "Bayesian inference" is meant in the context of present invention all those methods, algorithms and mathematical statistical methodologies which can be traced back to the mathematician Thomas Bayes, and which allow to be ascertained a so-called "sparse" solution of an otherwise under-determined system of equations, in that, initially, a particular probability distribution is based in sought-after vector values, such as, for example, the Gaussian distribution. An example of such an algorithm on the basis of the Bayesian inference is given further below in the description of an example of an embodiment.

According to an additional advantageous embodiment of the arrangement of the invention, a memory module is provided, in which spectrometric reference data for measured substances as well as particular relevant extracted spectral fractions $X_{rel}$ of current measurements are stored and storable. With help of the stored spectrometric reference data for different substances, the calibration arrangement of the invention is able to conduct a checking of the measurement results and the calibrating in terms of a so-called cross validation. The stored reference data for spectral fractions of different substances can likewise have been ascertained on the basis the method of the invention, or with the assistance of classic calibration methods for spectrometer systems, such as, for example, the so-called partial-least-squares method (PLS method for short), or the NIPALS algorithm.

According to an additional advantageous embodiment of the calibration arrangement of the invention, a computing unit is present, by means of which, via a comparison of stored spectrometric reference data and current measurement data, calibration signals are producible, which can be automatically input into the calibration unit of the spectrometric apparatus for calibrating. The computing unit is, in such case, specifically matched to an automatic comparing, storing and forwarding of the particular spectrometric data needed. The matching can be executed in the form of a program or via firmly installed operations between electronic components. Essential for the present invention is that a calibration on the basis of measurement data estimated with iterative mathematical methods and reduced to the relevant values is automatically put into practice, so that the bringing in of an expert and the influence of individual (and, for example, deviating) expert knowledge have no negative influence on the calibration quality and therewith on the measurement results in the case of measurements with the spectrometric system.

BRIEF DESCRIPTION OF THE DRAWINGS

Other advantages, features and embodiments the present invention are to be drawn from the following description of a preferred example of an embodiment in connection with the appended drawing, the figures of which show as follows.

DETAILED DISCUSSION IN CONJUNCTION WITH THE DRAWINGS

Figure 1:
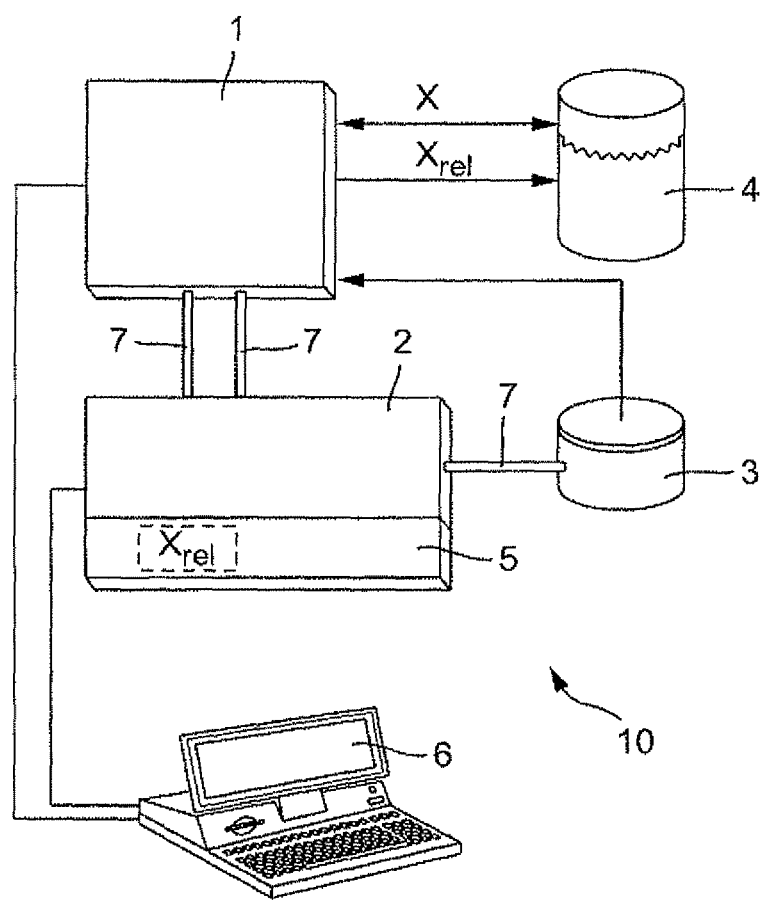
FIG. 1 is an example of an embodiment of a calibration arrangement of the invention for a spectrometric apparatus.

FIG. 1 of the drawing shows as schematic block diagram an example of an embodiment of a calibration arrangement 10 of the invention of a spectrometric apparatus 1. According to this example of an embodiment, the arrangement 10 for calibrating the spectrometric apparatus 1 includes as main components at least one spectrometric apparatus 1, which is provided for measuring a substance 4 or measured object and the associated wavelengths, as well as their intensities. The spectrometric apparatus 1 can be a spectrometric apparatus of any type. The invention especially involves spectrometric apparatuses as they are conventionally used in chemometrics and during chemometric data analyses. According to the invention, for the calibrating the spectrometric data, i.e. the spectral fractions X to be measured and the associated substance concentrations of the substance 4, a calibration unit 2 is provided, which is operated with a new method for automatic calibrating of the data or the spectrometric apparatus 1.

The calibration unit 2 is here connected via data lines 7 with the spectrometric apparatus 1. The calibration unit 2 includes a selection module 5 for automatic extracting of relevant spectral fractions $X_{rel}$ from the measured spectrometric data X. According to the invention, the particular spectral fractions $X_{rel}$ physically relevant for the measuring of a specific substance 4 are ascertained by the selection module 5 automatically, i.e. extracted from the total measurement data X without intervention of an expert. For this purpose, in the case of this example of an embodiment, the selection module 5 of the calibration unit 2 draws on a mathematical statistical methodology, which is known as a so-called Bayesian inference. This is, in the illustrated example of an embodiment, stored in the form of an algorithm as a program module in the selection module 5. The selection module 5 automatically ascertains from the measured spectral fractions X the spectrometric data $X_{rel}$ relevant for the particular measuring procedure and the particular measurement object or substance 4, which are then stored in a memory module 3. In the context of the present description those spectra or wavelengths in which the particular substance absorbs light are viewed as physically relevant spectral fractions. Solely these, as spectral fractions $X_{rel}$ judged relevant in the selection module 5, are then used for calibrating the spectrometer arrangement 10. In the case of the illustrated example of an embodiment of the invention, a computing unit 6 is still present, which, as a human/machine interface, permits the input of programs and/or additional data. With the arrangement 10 of the invention for the calibrating the spectrometric apparatus 1, a completely automatic calibrating is possible with reduced calculational effort and time consumed, without recourse to expert knowledge and corresponding specialists previously necessary in the state of the art being required. The quality of the calibrating is nevertheless maintained, or indeed increased with respect to the previously known method. With the special selection methodology in the selection module 5, on the basis a Bayesian inference and of a corresponding algorithm or program method, from the original measured spectral fractions X, the values tending toward zero in the case of continuing iteration are automatically taken out, so that only relevant spectral fractions $X_{rel}$ remain. The methodology of the invention lying behind the selection module 5 is, in the following, described on the basis of an example with reference to corresponding mathematical bases. The application and the conversion of the mathematical statistical method according to Bayes in the context of calibration arrangement 10 in FIG. 1 can, in such case, occur in various manners, wherein a corresponding matching for the application of the invention, namely a calibrating of a spectrometric apparatus is, in each case, performed.

In chemometrics, and for calibrating of spectra measured with spectrometric apparatuses, as well as associated substance concentrations, in the state of the art, recourse was hitherto necessarily made to expert knowledge. Experts were necessary for selecting relevant measurement data from a plurality of measured values of substance concentrations or spectral fractions. On the basis of spectrometer charts, the expert could, in each case, select the relevant spectral fractions or regions of spectra, and on this basis so-to-speak "manually" perform a calibrating of the apparatus and the measurement results.

Along with that, in addition to the expert knowledge, it was known in the state of the art to draw on so-called mathematical statistical methods. For example, in chemometrics, for calibrating of measured spectra, a partial-least-squares method, (PLS method for short) was hitherto used. Before the methodology of the invention for selection of relevant spectrometric measurement data is explored, for better understanding, the methodology for calibrating of measured spectra according to the PLS method hitherto used in the state of the art will be explained.

In the case of calibrating spectrometric data, the data are present first as a linear equation system:

$$y = Xw \quad (1)$$

This linear equation system must be solved, wherein the matrix X row-wise contains the spectra measured for the measurement object, or the substance 4. The matrix X has the dimension N*M, wherein N is the number of measured spectra, or spectral fractions and M refers to the number of measured wavelengths. The substance concentrations, with which one calibrates in the context of calibrating a spectrometer, are combined in the N-dimensional vector y. The goal in the procedure for achieving a calibration is, now, to so estimate the N-dimensional coefficient vector w, that the quadratic error is minimized. It involves, thus, a type of mathematical minimization problem, which can be expressed with the following equation (2).

$$e = |y - Xw|^2 \rightarrow mii \quad (2)$$

In such case, normally, in the case of spectrometric measurements, however, the problem is that the number of measured wavelengths M is much larger than the number of measured spectra N. This means that the number of equations to be solved is smaller than the number of value pair coefficients to be estimated. The above equation system (2) is, thus, mathematically under-determined and has, in principle, infinitely many solutions. The PLS (partial least squares) method known in the state of the art solves this problem by factoring the matrix X into so-called main components.

In the case of the calibration, then, only a few main components are utilized, whereby the above referenced minimization problem becomes uniquely solvable in this then limited space. An example of an iterative algorithm used in the state of the art for calculating the PLS solution is the so-called NIPALS (non-linear iterative partial least squares) algorithm. The disadvantage of these previously known methods (PLS, or NIPALS) is, however, that an automatic selection of relevant wavelengths, or spectral fractions, of a measuring by means of a spectrometric apparatus is not possible, if the calibration quality is to be maintained. The means that, when the wavelength range in the case of such a measuring and calibrating according to the state of the art is not limited manually by an expert, the result of a PLS calibrating in the present case of application for spectrometric apparatuses is always a fully occupied, coefficient vector w, whose entries are all unequal to zero, and, thus, in the case of the calibrating in the calibration unit, always the spectral fractions of all wavelengths must be taken into consideration. This leads to a high calculative effort and to a long calibration duration. The greatest disadvantage of this method according to the state of the art is, however, that an automatic performing of the calibrating, i.e. a calibrating without recourse to an expert with the corresponding technical knowledge, is not possible with these known calibration methods.

The present invention solves this problem in the following way: In order to find a coefficient vector w, in the case of which the entries, which correspond to irrelevant wavelengths, disappear, a new methodology is used in a specially adapted selection module 5 of the calibration unit 2 (compare FIG. 1): Only the entries in the coefficient vector w, which concern relevant wavelengths, are maintained. In other words, the entries, which correspond, in the investigated case, to irrelevant wavelengths, are eliminated from the vector. Mathematically, this means that only the entries in the coefficient vector w, which correspond to the relevant wavelengths, should be unequal to zero. Such a solution is referenced as "thinly occupied", or sparse. According to the invention, this is solved in the selection module 5 of the calibration arrangement 10 with the methodology of so-called Bayesian inference after the mathematician, Thomas Bayes. In such case, it is assumed, that the sought coefficient vector w was generated by a determined probability distribution p.

The selection criterion of the invention can rest, for example, on the following mathematical assumptions and method steps: It is assumed, that the coefficient vector W is determined statistically by a generalized Gaussian distribution:

$$p(w) \propto \exp\left(-\sum_{i=1}^{M} |w_i|^t\right) \quad (3)$$

with t∈[0,1]. Represented with wi are the respective entries of spectrometric data of a measuring with the spectrometric apparatus 1, as mapped in the coefficient vector W. This assumption corresponds to a new modifying of the above referenced minimizing problem in the form:

$$w = \underset{w}{\operatorname{argmin}} \|y - Xw\|^2 + \lambda \sum_{i=1}^{M} |w_i|^t \quad (4)$$

with a small parameter λ, which determines, to what extent the length of the coefficient vector W enters deleteriously into the function to be minimized. The solution of this problem (equation (4)) is, in each case, thinly occupied for t∈[0,1], i.e. it is a thinly occupied solution.

The latent parameters in the here assumed probability distribution p, which will not be explored further here, can be estimated according to the present invention by iterative methods based on the so-called Bayesian inference. For the principles of such iterative methods in other fields of application than that of the present invention, reference can be made to the following scientific article: D. P. Wipf, R. R. Ramirez, J. A. Palmer, S. Makeig, and B. D. Rao, "Analysis of Empirical Bayesian Methods for Neuroelectromagnetic Source Localization". Advances in Neural Information Processing Systems, 19 (NIPS 2006), MIT Press, 2007; M. E. Tipping, "Sparse Bayesian learning and the relevance vector machine". Journal of Machine Learning Research 1, MIT Press, 2001.

If the probability for a certain coefficient of the coefficient vector w trends during the iteration in the selection module 5 of the invention toward zero, the corresponding entry in the coefficient vector w is removed. The means that only relevant spectral fractions $X_{rel}$ are extracted from the totality of measured spectral fractions X. After convergence, there remain by the method of the invention only entries relevant for the regression. Through the use in the invention of so-called Bayesian inference methodologies in the selection of physically, in each case, relevant, measured values in the selection module 5, the calibrating of a spectrometric apparatus 1 can now be completely automatic. A recourse to the previously indispensably necessary, expert knowledge is no longer required in the case of the invention. Moreover, by reducing the coefficient vector to relevant measurement data, the measuring and calibrating become much faster, since only at selected wavelengths, or wavelength ranges must there be measured anew. Particularly, by the calibration method of the invention and the arrangement of the invention for the calibrating, the calibration quality is further improved. Also, other applications of the method of the invention are options, such as e.g. use of the method for diagnostic purposes: If one establishes e.g. that, in selected wavelengths or wavelength ranges, significant changes occur since the last calibrating, this can be used according to the invention as an indication of aging of certain components of the spectrometric apparatus 1, or the spectrometer arrangement 10.

Figure 2A:
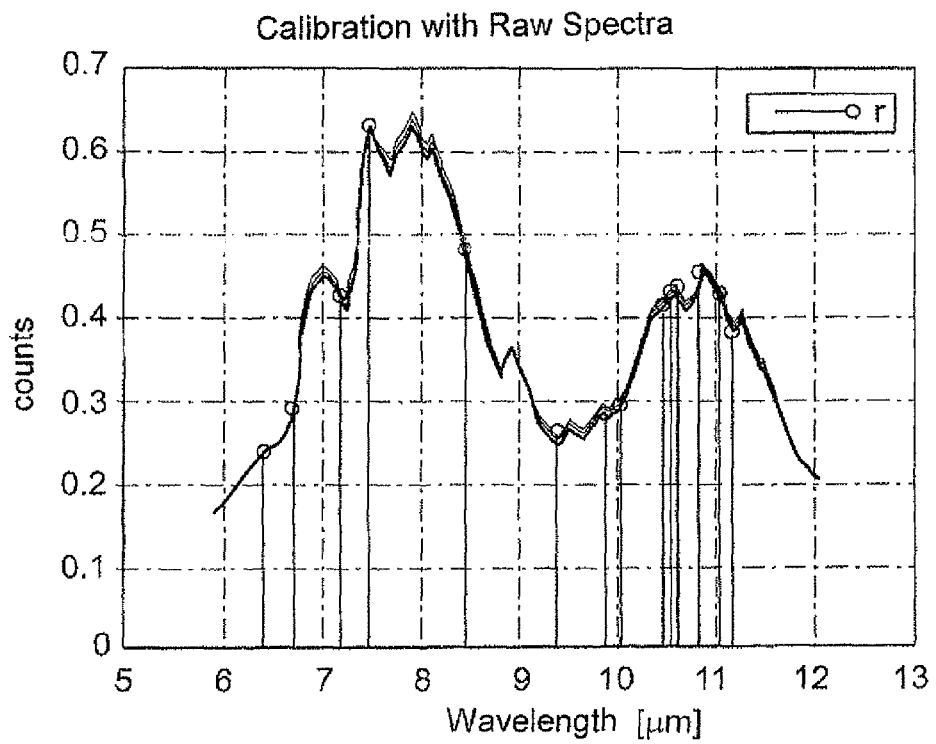
FIG. 2a is a chart of a spectrometric measurement with the method of the invention on the basis of a wine sample.
Figure 2B:
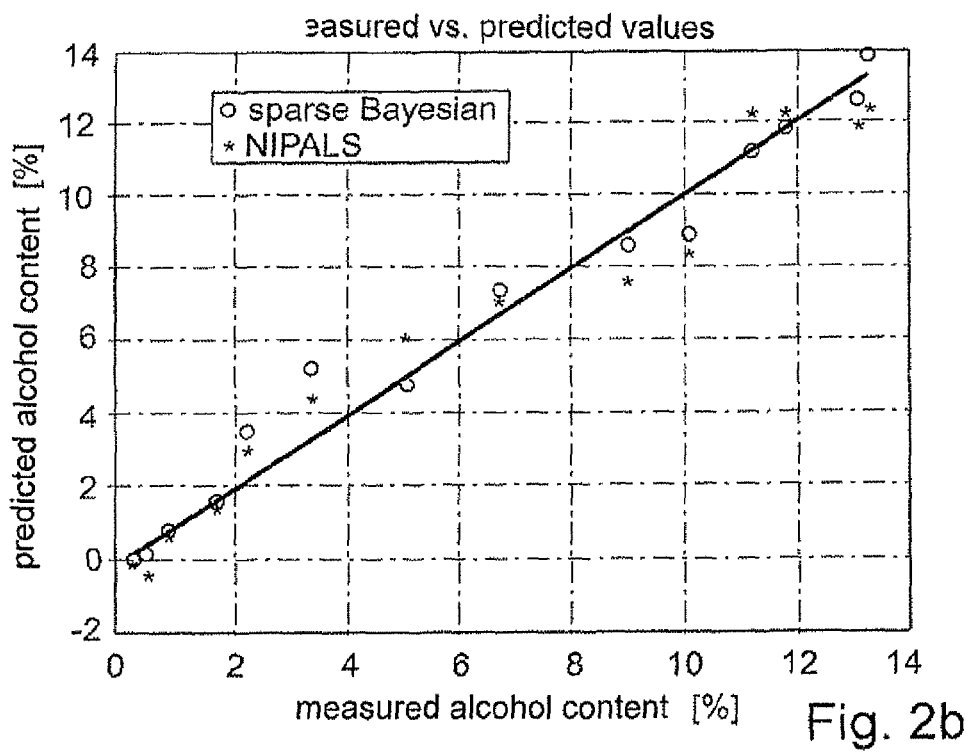
FIG. 2b shows measurements belonging to the measurement in FIG. 2a, a validation graph of measured values measured and predicted with the method of the invention, in comparison to measured values measured and predicted with a method according to the state of the art.

FIG. 2a shows a chart with spectrometric data for illustrating the calibration method of the invention. FIG. 2b shows a cross validation graph for the purpose of validating the effectiveness and functional ability of the calibration method of the invention, wherein measured values obtained with the method of the invention (sparse Bayesian) are plotted in comparison with measured values obtained with a state of the art method (NIPALS).

In the case of the FIG. 2a illustrated chart of spectrometric data, plotted on the abscissa are wavelengths and, on the ordinate, substance concentrations. There are, in the case of this example of a measuring and calibrating with the calibration method of the invention, 14 raw spectra to be detected, which have arisen in the case of measuring a wine sample as measurement object, or substance, 4 by means of the spectrometric apparatus 1. The measured variable is the alcohol content of different samples of the wine. The lines referenced with r refer to the wavelengths, which were selected by the described calibration method automatic in the selection module 5. From a total of 87 wavelengths of this measuring of a wine sample by the spectrometer 1, here, 15 wavelengths, or spectral fractions, were detected as relevant, i.e. physically relevant spectral fractions $X_{rel}$ for the presently considered measuring procedure on the wine. The fraction 15/87 of the wavelengths corresponds to a percentage of 17.24%. By this "thinly occupied" solution, a subsequent measuring can be performed in correspondingly reduced time, i.e. only 17.24% of the original time of a measuring are required, since only at these selected wavelengths are new measurements required with the spectrometric apparatus 1.

The comparison shown in FIG. 2b of the calibration method of the invention based on Bayesian inference, or a similar method, with a traditional method according to the state of the art (here, NIPALS-algorithm) makes clear likewise the advantages and effectiveness of the methodology of the invention for increasing calibration quality: Given on the ordinate, in each case, is the predicted alcohol content in %. On the abscissa is given the measured alcohol content in %. The measured values measured with the method of the invention are indicated with * ("star"=Bayes), while the values ascertained with the traditional NIPALS method were plotted with "point" (=NIPALS). Always a calibrating with both methods was performed with 13 of the 14 selected spectra at 5 main components. The prediction was performed on the omitted spectrum. The nearer the points (sparse Bayesian), respectively, stars (NIPALS) are to the line, the better is the prediction. The average error in the case of this so-called cross validation amounts, in the case of the new method of the invention, the so-called "Sparse Bayesian Calibration Method", to 0.4924% and, in the case of the classic calibrating according to the state of the art-technology, NIPALS method, to 0.7243%. The means that, in this case, the prediction with the method of the invention is even more exact, although here the subset of wavelengths shown in FIG. 2a was used. This comparison of the method of the invention with the method according to the state of the art shows that the method of the invention leads for improving calibration quality, not to mention the marked reducing of the time required for measurements and calibration procedures.

The invention claimed is:

1. The arrangement for calibrating a spectrometer for application in chemometrics or chemometric processes in the context of measuring spectral fractions of a substance to be examined, comprising:
   a spectrometric apparatus for measuring spectral fractions X of the substance to be examined;
   a calibration unit for calibrating the spectrometric apparatus;
   a memory module for storing measured and evaluated, spectrometric data; and
   a selection module, via which, based on a mathematical iteration method, physically relevant spectral fractions Xref of a measurement are automatically extractable, and said selection module is connected with said memory module and said spectrometric apparatus;
   said arrangement is adapted to store the totality of the measured spectral fractions X in said memory module as spectrometric measurement data in the form of a multidimensional coefficient vector; and
   said mathematical iterative estimation method comprises an iterative estimation method according to Bayes, via which coefficient values of the multidimensional coefficient vector tending toward zero during the iteration are removed before a regression analysis.

2. The arrangement as claimed in claim 1, wherein:
   said selection module is connected via bidirectional data lines with said memory module and/or said spectrometric apparatus.

3. The arrangement as claimed in claim 1, wherein:
   the mathematical iteration method in said selection module is furnished as a program, which is automatically executed in said calibration unit after each measurement.

4. The arrangement as claimed in claim 1, wherein:
   the mathematical iteration algorithm in said selection module is based on a method applying Bayesian inference.

5. The arrangement as claimed in claim 1, further comprising:
   a memory module, in which spectrometric reference data for measured substances as well as, in each case, relevant extracted spectral fractions $X_{rel}$ of current measurements are stored and storable.

6. The arrangement as claimed in claim 1, further comprising:
   a computing unit, by means of which, via comparison between stored spectrometric reference data and current measurement data calibration signals are producible, which can be input into said calibration unit of said spectrometric apparatus automatically for the calibrating.

7. The arrangement as claimed in claim 1, wherein:
   said selection module is provided in said calibration unit;
   said selection module is embodied to automatically extract said physically relevant spectral fractions $X_{rel}$ from a totality of said spectral fractions X measured by said spectrometric apparatus based on said mathematical iteration method.

8. The arrangement as claimed in claim 1, wherein:
   said physically relevant spectral fractions $X_{rel}$ are those spectra or wavelengths in which said substance to be examined absorbs light.

9. The arrangement as claimed in claim 7, wherein:
   said selection module is provided in said calibration unit;
   said selection module is embodied to automatically extract said physically relevant spectral fractions $X_{rel}$ from a totality of said spectral fractions X measured by said spectrometric apparatus based on said mathematical iteration method.

10. An arrangement for calibrating a spectrometer comprising: a spectrometric apparatus for measuring spectral fractions X of a substance to be examined, said spectrometric apparatus being adapted to measure a totality of spectral fractions X of said substance;
    a calibration unit for calibrating the spectrometric apparatus;
    a memory module for storing measured and evaluated spectrometric data; and
    a selection module provided in said calibration unit, said selection module being embodied to automatically extract physically relevant spectral fractions Xref from said totality of spectral fractions X measured by said spectrometric apparatus using a mathematical iterative estimation method and to store said physically relevant spectral fractions Xref in said memory module for calibrating the spectrometer arrangement;
    said arrangement is adapted to store the totality of the measured spectral fractions X in said memory module as spectrometric measurement data in the form of a multidimensional coefficient vector; and
    said mathematical iterative estimation method comprises an iterative estimation method according to Bayes, via which coefficient values of the multidimensional coefficient vector tending toward zero during the iteration are removed before a regression analysis.

11. The arrangement as claimed in claim 10, wherein:
said arrangement is further adapted to feed said physically relevant spectral fractions $X_{rel}$ to the calibration unit for calibrating the spectrometric apparatus.

12. The arrangement as claimed in claim 10, wherein:
said mathematical iterative estimation method is based on a method applying Bayesian inference.

13. The arrangement as claimed in claim 10, wherein:
said physically relevant spectral fractions $X_{rel}$ are those spectra or wavelengths in which said substance to be examined absorbs light.

\* \* \* \* \*